(12) United States Patent
Haruno et al.

(10) Patent No.: US 9,003,639 B2
(45) Date of Patent: Apr. 14, 2015

(54) METHOD OF MANUFACTURING A ROTOR

(75) Inventors: Kentaro Haruno, Toyota (JP); Taketo Takeuchi, Nishio (JP); Atsushi Watanabe, Toyota (JP); Kenichiro Fukumaru, Nishikamo-gun (JP); Katsumi Amano, Kitakyushu (JP); Kazutoshi Ueda, Kitakyushu (JP); Takashi Fukumoto, Kitakyushu (JP)

(73) Assignees: Toyota Jidosha Kabushiki Kaisha, Aichi-ken (JP); Mitsui High-Tec, Inc., Fukuoka-ken (JP)

( * ) Notice: Subject to any disclaimer, the term of this patent is extended or adjusted under 35 U.S.C. 154(b) by 0 days.

(21) Appl. No.: 13/554,689

(22) Filed: Jul. 20, 2012

(65) Prior Publication Data

US 2012/0285004 A1    Nov. 15, 2012

Related U.S. Application Data

(62) Division of application No. 12/280,646, filed as application No. PCT/JP2007/054121 on Feb. 26, 2007, now abandoned.

(30) Foreign Application Priority Data

Feb. 27, 2006    (JP) .................................. 2006-050689

(51) Int. Cl.
*H02K 1/27*    (2006.01)

(52) U.S. Cl.
CPC .......... *H02K 1/2766* (2013.01); *H02K 2201/09* (2013.01); *Y02T 10/641* (2013.01)

(58) Field of Classification Search
CPC ................ H02K 1/2766; H02K 1/276–1/2773

USPC ............ 29/598; 310/156.56, 156.21, 156.23, 310/156.53, 216.114, 216.48
See application file for complete search history.

(56) References Cited

U.S. PATENT DOCUMENTS

| | | | |
|---|---|---|---|
| 4,568,846 A | 2/1986 | Kapadia |
| 4,835,840 A | 6/1989 | Stokes |
| 4,939,398 A | 7/1990 | Lloyd |
| 5,038,460 A | 8/1991 | Ide et al. |
| 5,159,220 A | 10/1992 | Kliman |
| 5,936,323 A | 8/1999 | Shibukawa et al. |
| 6,353,275 B1 | 3/2002 | Nishiyama et al. |
| 6,437,473 B1 | 8/2002 | Mobius et al. |

(Continued)

FOREIGN PATENT DOCUMENTS

| | | |
|---|---|---|
| CN | 1316814 A | 10/2001 |
| EP | 1 536 543 A1 | 6/2005 |

(Continued)

OTHER PUBLICATIONS

Machine Translation of JP2002-034187A, obtained Dec. 3, 2012.*

(Continued)

*Primary Examiner* — Livius R Cazan
(74) *Attorney, Agent, or Firm* — Sughrue Mion, PLLC

(57) ABSTRACT

A rotor includes a rotor core fixedly attached to a rotational shaft and having a plurality of hole portions arranged in the circumferential direction, a magnet inserted into a plurality of hole portions each, and a filling portion injected into the hole portion. The filling portion is injected into the hole portion from a gate facing a central part in the width direction of the magnet in the opening of the hole portion.

5 Claims, 4 Drawing Sheets

(56) References Cited

U.S. PATENT DOCUMENTS

| | | |
|---|---|---|
| 6,826,824 B2 | 12/2004 | Hiroyuki et al. |
| 6,891,298 B2 | 5/2005 | Gary |
| 6,944,929 B2 | 9/2005 | Ogawa et al. |
| 6,946,766 B2 | 9/2005 | Gary et al. |
| 7,262,526 B2 | 8/2007 | Shiga et al. |
| 7,456,539 B2 | 11/2008 | Matsumoto et al. |
| 7,500,848 B2 | 3/2009 | Maeda et al. |
| 7,622,841 B2 | 11/2009 | Yoshikawa et al. |
| 2006/0103253 A1 | 5/2006 | Shiga et al. |
| 2006/0186752 A1* | 8/2006 | Matsumoto et al. ..... 310/156.53 |
| 2007/0145849 A1 | 6/2007 | Okamoto et al. |
| 2009/0026867 A1 | 1/2009 | Haruno et al. |
| 2009/0079287 A1 | 3/2009 | Hattori et al. |

FOREIGN PATENT DOCUMENTS

| | | | |
|---|---|---|---|
| FR | 2 736 220 A1 | | 1/1997 |
| JP | 05-083892 A | | 4/1993 |
| JP | 06-245473 A | | 9/1994 |
| JP | 09-294344 A | | 11/1997 |
| JP | 11-329814 A | | 11/1999 |
| JP | 2000-083334 A | | 3/2000 |
| JP | 2001-246638 A | | 9/2001 |
| JP | 2001-352702 A | | 12/2001 |
| JP | 2002-034187 A | | 1/2002 |
| JP | 2002-34187 A | | 1/2002 |
| JP | 2002034187 A | * | 1/2002 |
| JP | 2002-136008 A | | 5/2002 |
| JP | 2002-272033 A | | 9/2002 |
| JP | 2002-354722 A | | 12/2002 |
| JP | 2002-359942 A | | 12/2002 |
| JP | 2002-359955 A | | 12/2002 |
| JP | 2003-199303 A | | 7/2003 |
| JP | 2003-259577 A | | 9/2003 |
| JP | 2004-147451 A | | 5/2004 |
| JP | 2004-254466 A | | 9/2004 |
| JP | 2004-328963 A | | 11/2004 |
| JP | 2004-357347 A | | 12/2004 |
| JP | 2005-012859 A | | 1/2005 |
| JP | 2005-269804 A | | 9/2005 |
| JP | 2006-238584 A | | 9/2006 |
| JP | 2006-345600 A | | 12/2006 |
| JP | 2006345600 A | * | 12/2006 |
| WO | 2004/001930 | | 12/2003 |
| WO | 2005/043741 A2 | | 5/2005 |

OTHER PUBLICATIONS

Chinese Office Action, corresponding Application No. 200780006835.6, dated Jun. 12, 2010.

Machine Translation of JP 05-083892, "Permanent Magnet Rotor", Apr. 2, 1993, Nagate et al.

Machine Translation of JP 09-294344, "Rotor of Permanent Magnet Type Rotating Machine", Mizuno et al. Nov. 11, 1997.

English-language Machine Translation of JP 2006-345600, Matsumoto, Katsunari, "Magent Fixing Method, and Rotor and Dynamo-Electric Machine", Dec. 21, 2006.

English-language Machine Translation of JP 2002-034187, Arita et al., "Magnet Emgedded Rotor", Jan. 31, 2002.

* cited by examiner

METHOD OF MANUFACTURING A ROTOR

CROSS-REFERENCE TO RELATED APPLICATIONS

This application is a divisional of U.S. application Ser. No. 12/280,646, filed Aug. 25, 2008 now abandoned, which is a 371 of PCT/JP2007/054121 filed on Feb. 26, 2007, which is based on and claims priority under 35 USC 119 from Japanese Patent Application No. 2006-050689 filed Feb. 27, 2006, the entire contents of which are incorporated herein by reference.

TECHNICAL FIELD

The present invention relates to a rotor and an electric vehicle, and particularly to a rotor using a filler to secure a magnet to a rotor core as well as an electric vehicle including the rotor.

BACKGROUND ART

Japanese Patent Laying-Open No. 2002-034187 (Patent Document 1) discloses a rotor in which a resin material fills a space between a hole provided in a rotor core and a permanent magnet embedded in the hole so as to secure the permanent magnet to the rotor core.

Japanese Patent Laying-Open No. 2001-352702 (Patent Document 2) discloses an outer rotor having an adhesive pool in an end portion in the width direction of a magnetized surface of a magnet.

Japanese Patent Laying-Open No. 2004-357347 (Patent Document 3) discloses a rotor in which a groove is provided in an end plate for the purpose of avoiding a caulked portion of a laminated steel.

Japanese Patent Laying-Open No. 2002-354722 (Patent Document 4) discloses a rotor in which a caulked portion of a laminated steel is provided inward in the radial direction with respect to a permanent magnet.

In the rotor disclosed in Patent Document 1, the rotor core includes another hole for injecting a resin therefrom in addition to the hole into which the magnet is inserted. As a result, the strength of the rotor core could be deteriorated, or there could be any influence on the magnetic characteristic, in some cases. In addition, downsizing of the rotor is hindered.

In the rotor disclosed in Patent Document 2, a central portion in the width direction of the magnet is supported by the rotor core on the outer peripheral side of the rotor core, and thus a stress generated on the rotor core at this portion increases.

In the case where a groove is provided in an end plate as disclosed in Patent Document 3, the surface pressure between the rotor core and the end plate could be excessively increased in some cases. Patent Document 4 does not disclose a structure with which this problem can be sufficiently solved.

DISCLOSURE OF THE INVENTION

An object of the present invention is to provide a rotor that is downsized and has a high durability as well as an electric vehicle including the rotor.

A rotor according to the present invention includes: a rotor core fixedly attached to a rotational shaft and having a plurality of hole portions arranged in a circumferential direction; a magnet inserted into the plurality of hole portions each; and a filling portion injected into the hole portion. The filling portion is injected into the hole portion from a portion facing a central part in a width direction of the magnet in an opening of the hole portion.

Here, regarding the rotor of the present invention, "filling portion" refers to a portion intended to secure the magnet to the rotor core, not by adhesion but chiefly by filling the inside of the hole portion.

In the above-described structure, when the filling portion is injected, the magnet can be stably pressed opposite in the radial direction, relative to the portion where the filling portion is injected. Therefore, the precision in balance of the magnets arranged in the circumferential direction is improved. Further, since the filling portion is injected from the opening of the hole portion, a separate hole portion for injecting the filling portion therefrom is unnecessary. Accordingly, deterioration in strength can be suppressed to improve the durability of the rotor, and the rotor can be downsized.

In the rotor, preferably the hole portion includes an extension in a portion facing a corner of the magnet, for helping spread of the filling portion.

In this way, the spread of the filling portion into this extension can be helped.

In the rotor, preferably the filling portion is injected into the hole portion from a portion facing a central part of a side of the magnet, the side being located inward in a radial direction of the rotor core.

Thus, when the filling portion is injected, the magnet can be pressed outward in the radial direction. Therefore, the side surface located outward in the radial direction of the magnet and the rotor core can be allowed to contact each other uniformly. As a result, the centrifugal force acting on the magnet when the rotor is rotated can be dispersed more uniformly and transmitted to the rotor core, and thus the durability of the rotor is improved.

In the rotor, preferably the hole portion includes an outer extension facing a corner of the magnet that is located outward in the radial direction, for helping spread of the filling portion. More preferably, outer extensions and inner extensions for helping spread of the filling portion are provided in respective portions facing four corners in an axial cross section of the magnet in the hole portion.

In this way, the spread of the filling portion into the extensions can be helped.

Preferably, the rotor further includes an end plate provided on an axial end surface of the rotor core. The rotor core is formed of a laminated steel. On the axial end surface of the rotor core, a first projection located at a caulked portion of the laminated steel and a second projection located at a portion where the filling portion is injected are formed. The first projection and the second projection are substantially concentrically provided such that a common groove for avoiding the first projection and the second projection can be formed in the end plate.

In the above-described structure, excessive increase of the surface pressure between the rotor core and the end plate is suppressed while interference between the end plate and the first and second projections can be avoided.

An electric vehicle according to the present invention includes the rotor as described above.

Thus, the electric vehicle including the rotor exhibiting a high thermal dissipation property of the magnet can be obtained.

In accordance with the present invention as described above, the rotor can be downsized and the durability can be improved.

BEST MODES FOR CARRYING OUT THE INVENTION

Figure 1:
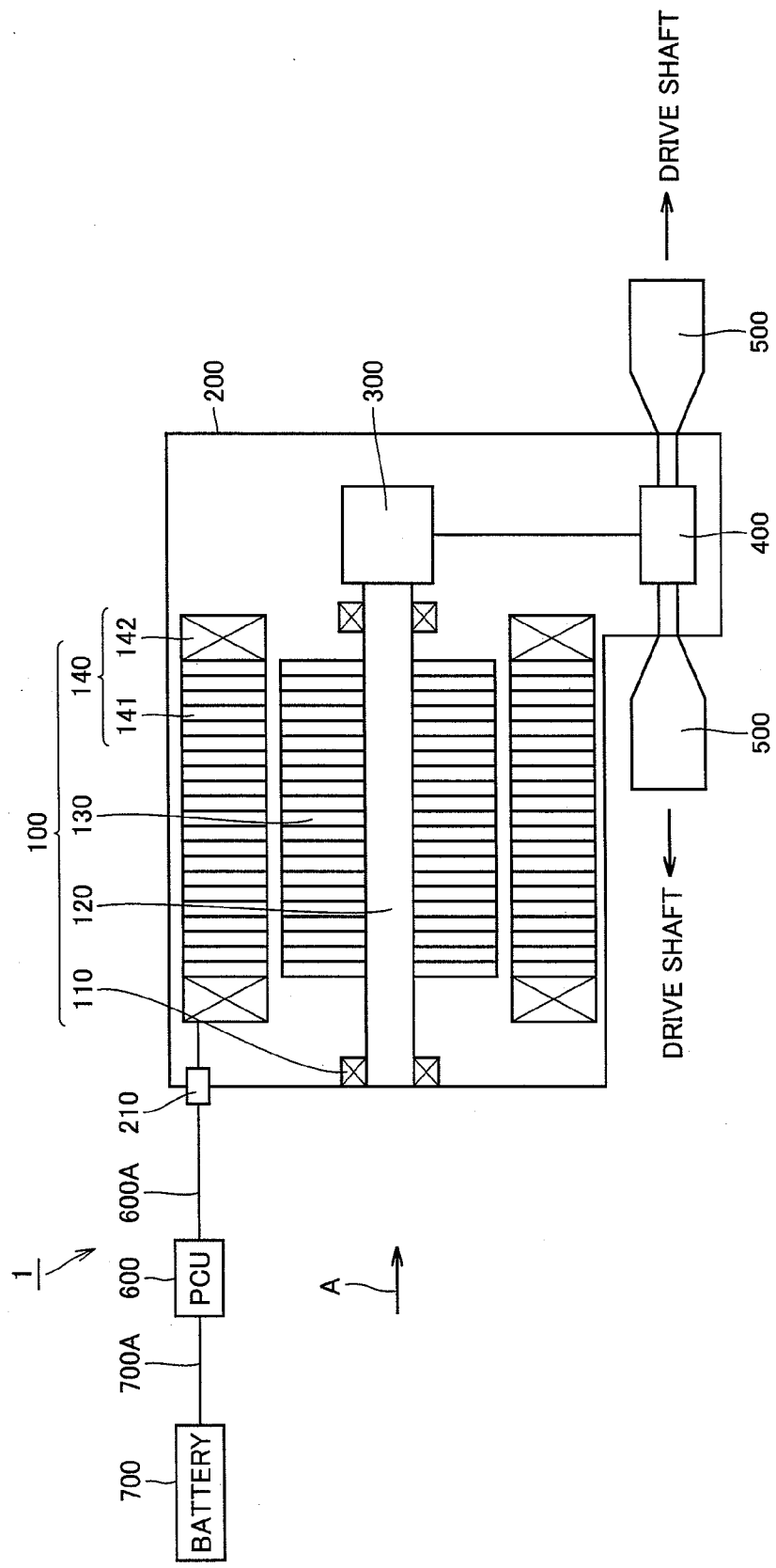
FIG. 1 is a diagram schematically showing a structure of a drive unit to which a rotor according to an embodiment of the present invention is applied.

In the following, a description will be given of an embodiment of a rotor and an electric vehicle based on the present invention. Here, like components are denoted by like reference characters and a description thereof will not be repeated in some cases.

FIG. 1 is a diagram schematically showing a structure of a drive unit to which a rotor according to an embodiment of the present invention is applied. In the example shown in FIG. 1, drive unit 1 refers to a drive unit mounted on a hybrid vehicle that is "electric vehicle" and is configured to include a motor generator 100, a housing 200, a reduction mechanism 300, a differential mechanism 400, and a driveshaft receiving portion 500.

Motor generator 100 is a rotating electric machine having the function of an electric motor or electric generator, and includes a rotational shaft 120 rotatably attached to housing 200 via a bearing 110, a rotor 130 attached to rotational shaft 120, and a stator 140. Stator 140 includes a stator core 141, and a coil 142 is wound around stator core 141. Coil 142 is electrically connected to a feed cable 600A via a terminal block 210 provided to housing 200. Feed cable 600A has another end connected to a PCU 600. PCU 600 is electrically connected to a battery 700 via a feed cable 700A. Accordingly, battery 700 and coil 142 are electrically connected.

The motive energy that is output from motor generator 100 is transmitted from reduction mechanism 300 via differential mechanism 400 to driveshaft receiving portion 500. The drive force transmitted to driveshaft receiving portion 500 is transmitted in the form of a rotational force via a driveshaft (not shown) to wheels (not shown) to cause the vehicle to run.

In contrast, when the hybrid vehicle is regeneratively braked, the wheels are rotated by an inertial force of the vehicle body. The rotational force from the wheels drives motor generator 100 via driveshaft receiving portion 500, differential mechanism 400 and reduction mechanism 300. At this time, motor generator 100 operates as an electric generator. The electric power generated by motor generator 100 is stored in battery 700 via an inverter in PCU 600.

Feed cables 600A, 700A are each a three-phase cable formed of a U phase cable, a V phase cable and a W phase cable. Coil 142 is formed of a U phase coil, a V phase coil and a W phase coil, and respective terminals of these three coils are connected to feed cables 600A, 700A that are each the three-phase cable.

The use of motor generator 100 is not limited to a hybrid vehicle (HV) and may be mounted on other "electric vehicles" (such as fuel cell vehicle and electric vehicle for example).

Figure 2:
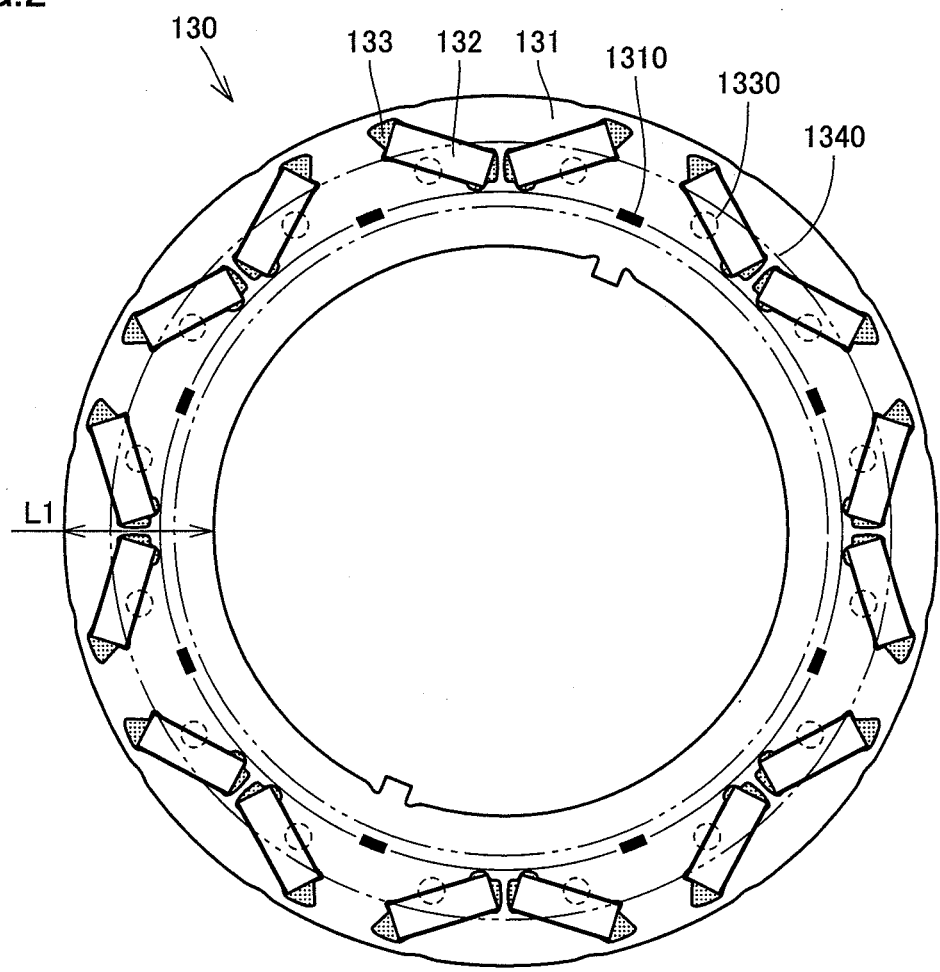
FIG. 2 is a plan view of a rotor according to an embodiment of the present invention.
Figure 3:
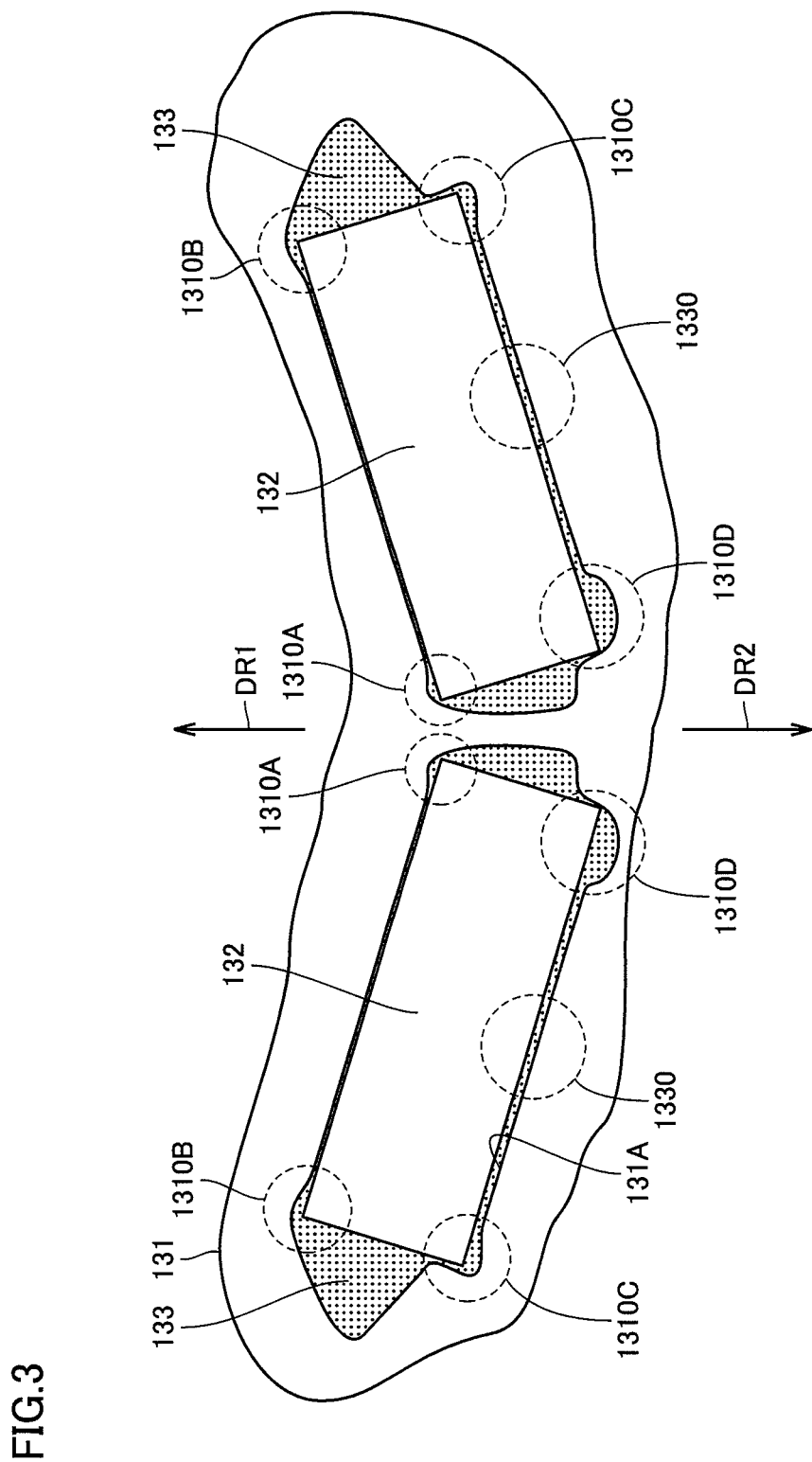
FIG. 3 is an enlarged view showing a magnet-inserted portion and therearound in the rotor shown in FIG. 2.
Figure 4:
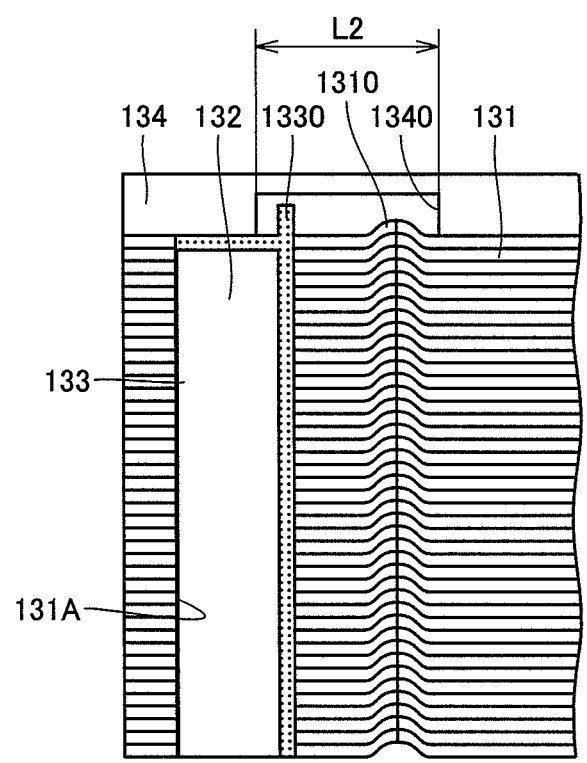
FIG. 4 is a longitudinal cross section of the rotor shown in FIG. 2.

FIG. 2 is a plan view of rotor 130. FIG. 3 is an enlarged view showing a magnet-inserted portion and therearound in rotor 130. FIG. 4 is a longitudinal cross section of rotor 130. Referring to FIGS. 2 to 4, rotor 130 includes a rotor core 131 fixedly attached to rotational shaft 120 and having a plurality of hole portions 131A arranged in the circumferential direction, a magnet 132 inserted into a plurality of hole portions 131A each to be embedded in rotor core 131, a resin portion 133 filling a space between the side surface of hole portion 131A and magnet 132, and an end plate 134 provided on an end surface in the axial direction of rotor core 131.

Resin portion 133 that is "molded resin portion" is formed including an epoxy-based resin for example. Resin portion 133 is thus provided to secure magnet 132 to rotor core 131. Resin portion 133 secures magnet 132 to rotor core 131 not by means of adhesion but chiefly by filling the inside of hole portion 131A. Therefore, the ratio of filling resin portion 133 to the space in hole portion 131A is higher than the ratio of an adhesive used as a securing material for the magnet in a similar rotor core. In this way, magnet 132 can be precisely fixed in hole portion 131A. Here, resin portion 133 is poured from an opening of hole portion 131A into hole portion 131A without providing a special hole for injecting the resin therefrom. Accordingly, rotor 130 can be downsized.

Rotor core 131 includes a plurality of hole portions 131A arranged in the circumferential direction. Magnets 132 are inserted into a plurality of hole portions 131A respectively. Filling portion 133 is injected into hole portion 131A from a portion (gate 1330, see FIG. 3) facing a central part of a side of the magnet. The side of the magnet refers to the side located inside in the radial direction of rotor core 131, in the opening of hole portion 131A.

Attention is now given to the presence of a clearance between hole portion 131A and magnet 132. In the case for example where an adhesive is used to secure magnet 132, movement of magnet 132 in hole portion 131A cannot be controlled and accordingly difference between respective positions in the radial direction of magnets 132 occurs (namely the precision in balance is deteriorated). Further, in the case where magnets 132 are dominantly located inside in the radial direction in respective hole portions 131A, magnets 132 could be bent, depending on the ratio of the filling adhesive, due to a centrifugal force acting when the rotor is rotated, resulting in a local large stress on rotor core 131. In contrast, resin portion 133 is injected as described above from gate 1330 located at the central part of the magnet that is located inside in the radial direction of rotor core 131, and thus magnet 132 can be stably pressed outward in the radial direction of rotor core 131 when the resin is injected and accordingly the above-described problem can be solved.

Further, in rotor 130, hole portion 131A includes outer extensions 1310A, 1310B each in a portion facing a corner of magnet 132 that is located outward in the radial direction (the direction of an arrow DR1), for the purpose of helping the spread of filling portion 133, and includes inner extensions 1310C, 1310D each in a portion facing a corner of magnet 132 that is located inward in the radial direction (the direction of an arrow DR2), for the purpose of helping the spread of filling portion 133.

In the case as described above where resin portion 133 is injected from inside in the radial direction of the magnet, the resin spreads most hard around the outer corners in the radial direction of the magnet. Here, outer extensions 1310A and 1310B are provided at the corners, so that the spread of the resin portion can be efficiently helped without providing a hole for injecting the resin in addition to hole portion 131A.

As shown in FIG. 4, rotor core 131 is formed by superposing sheets of a magnetic material such as iron or an iron alloy into a laminated body. From an end surface in the axial direction of rotor core 131, a caulked portion 1310 of the laminated steel as well as a gate 1330 where the resin remains at the portion from which the filling portion is injected protrude. On the axial end surface of rotor core 131, end plate 134 is provided. In end plate 134, a groove 1340 for avoiding interference with caulked portion 1310 and gate 1330 is formed. Here, caulked portion 1310 and gate 1330 are provided in close proximity to each other (substantially concentrically) such that interference with the end plate can be avoided by means of the common groove 1340. Thus, caulked portion 1310 and gate 1330 can be housed in groove 1340 without making groove 1340 excessively large. Therefore, while an excessive increase of the surface pressure between rotor core 131 and end plate 134 is suppressed, interference between end plate 134 and caulked portion 1310 and gate 1330 can be avoided. Preferably, the width (L2) of groove 1340 is approximately not more than 15% of the width (L1) of rotor core 131 (more preferably approximately not more than 10% thereof). Groove 1340 as described above is provided so that the surface pressure of end plate 134 is slightly increased and the degree of flatness of the axial end surface of rotor core 131 is improved.

In the description above, the example is explained where gate 1330 is provided in the portion facing the central part of the side of the magnet that is located inward in the radial direction of rotor core 131, in the opening of hole portion 131A. Alternatively, gate 1330 may be provided in a portion facing a central part of a side of the magnet that is located outward in the radial direction of rotor core 131. Further, in the description above, the example is explained where outer extensions 1310A, 1310B and inner extensions 1310C, 1310D are provided. Instead, only one of outer extensions 1310A, 1310B and inner extensions 1310C, 1310D may be provided.

The description above is summarized as follows. Namely, rotor 130 according to the present embodiment includes rotor core 131 fixedly attached to rotational shaft 120 and having a plurality of hole portions 131A arranged in the circumferential direction, magnets 132 inserted respectively into a plurality of hole portions 131A, and filling portion 133 injected into hole portions 131A. Filling portion 133 is injected into hole portion 131A from a portion facing a central part in the width direction of magnet 132 in an opening of hole portion 131A.

Further, in rotor 130, hole portion 131A includes outer extensions 1310A, 1310B each in a portion facing a corner of magnet 132 that is located opposite in the radial direction (namely located outward in the radial direction) relative to the position where filling portion 133 is injected, for the purpose of helping the spread of filling portion 133. In addition, in rotor 130, inner extensions 1310C, 1310D are provided each in a portion facing a corner of magnet 132 that is located inward in the radial direction, for the purpose of helping the spread of filling portion 133. Namely, in rotor 130 of the present embodiment, (outer/inner) extensions 1310A to 1310D helping the spread of filling portion 133 are provided in respective portions facing the four corners of an axial cross section of magnet 132 in hole portion 131A.

Moreover, in rotor 130, on the end surface in the axial direction of rotor core 131 formed of a laminated steel, caulked portion 1310 of the laminated steel that is "first projection" as well as gate 1330 that is "second projection" located at the portion from which the filling portion is injected are formed. Caulked portion 1310 and gate 1330 are provided substantially concentrically such that common groove 1340 for avoiding the caulked portion and the gate can be formed in end plate 134.

In the rotor of the present embodiment, when filling portion 133 is injected, magnet 132 is pressed opposite, in the radial direction, to the position where filling portion 133 is injected. Therefore, the precision in balance of magnets 132 arranged in the circumferential direction of rotor 130 is improved. In particular, in the case where filling portion 133 is injected from a portion facing a central part of a side of magnet 132 that is located inward in the radial direction of rotor core 131, magnet 132 can be pressed outward in the radial direction when filling portion 133 is injected, so that rotor core 131 and a side located outward in the radial direction of magnet 132 can be uniformly brought into contact with each other. Accordingly, the centrifugal force acting on magnet 132 while the rotor is rotating can be more uniformly dispersed and transmitted to rotor core 131. Further, since filling portion 133 is injected from an opening of hole portion 131A, a separate hole for injecting filling portion 133 is unnecessary. Thus, deterioration of the strength can be suppressed to improve the durability of rotor 130 and rotor 130 can be downsized.

It should be construed that embodiments disclosed above are by way of illustration in all respects, not by way of limitation. It is intended that the scope of the present invention is defined by claims, and includes all modifications and variations equivalent in meaning and scope to the claims.

INDUSTRIAL APPLICABILITY

The present invention is applicable for example to a rotor and an electric vehicle.

The invention claimed is:

1. A method of manufacturing a rotor, the method comprising:

fixedly attaching a rotor core to a rotational shaft, wherein said rotor core has a plurality of hole portions arranged in a circumferential direction, wherein each of said hole portions has only a single opening on a single axial end surface of said rotor core, and wherein each of said hole portions is not connected by a channel inside said rotor core to any other opening on said rotor core;

inserting a magnet into each of said hole portions; and injecting a filling portion into each of said hole portions, wherein, for each hole portion, the filling portion is injected from the outside of said rotor through the opening directly into a portion defining a radially inner gap between the rotor and a central part of the larger dimension of the magnet, based on an axial cross section of the magnet, wherein said filling portion urges said magnet in a radial direction towards an outer circumference of said rotor core opposite to a position where said filling portion is injected such that an outward side surface of said magnet contacts said rotor core, and wherein said radially inner gap is narrower than a gap at a portion facing a corner of said magnet.

2. The method according to claim 1, wherein said hole portion includes an extension in a portion facing a corner of said magnet, for helping spread of said filling portion.

3. The method according to claim 1, wherein said hole portion includes an outer extension facing a corner of said magnet that is located outward in the radial direction, for helping spread of said filling portion.

4. The method according to claim 1, wherein outer extensions and inner extensions for helping spread of said filling portion are provided in respective portions facing four corners in an axial cross section of said magnet in said hole portion.

5. A method of manufacturing a rotor, the method comprising:

fixedly attaching a rotor core to a rotational shaft and having a plurality of hole portions arranged in a circumferential direction;
inserting a magnet into each of said hole portions;
injecting a filling portion into each of said hole portions from a portion facing a central part in a width direction of said magnet in an opening of a respective one of said hole portions; and
providing an end plate on an axial end surface of said rotor core,
wherein said rotor core is formed of a laminated steel,
wherein, on said axial end surface, a first projection located at a caulked portion of said laminated steel and a second projection located at a portion where said filling portion is injected, are formed, and
wherein said first projection and said second projection are substantially concentrically provided such that a common groove for avoiding said first projection and said second projection can be formed in said end plate.

* * * * *